Oct. 24, 1939.                T. B. DOE ET AL                    2,177,098
                               POWER TRANSMISSION
                        Original Filed May 15, 1936        2 Sheets-Sheet 1

INVENTORS
THOMAS B. DOE
EDWIN L. ROSE
BY Ralph L. Truesdale
ATTORNEY

Oct. 24, 1939.  T. B. DOE ET AL  2,177,098
POWER TRANSMISSION
Original Filed May 15, 1936  2 Sheets-Sheet 2

INVENTORS
Thomas B. Doe
Edwin L. Rose
BY Ralph L. Tweedale
ATTORNEY

Patented Oct. 24, 1939

2,177,098

UNITED STATES PATENT OFFICE 2,177,098

POWER TRANSMISSION

Thomas B. Doe, New York, N. Y., and Edwin L. Rose, Waterbury, Conn., assignors to The Waterbury Tool Company, Waterbury, Conn., a corporation of Connecticut Application May 15, 1936, Serial No. 79,856
Renewed January 13, 1938

14 Claims. (Cl. 103—38)

This invention relates to power transmissions, particularly to those of the fluid pressure operated type wherein the position of a movable member may be controlled in accordance with the position of a control element which may be located at a distance from the movable member.

It is an object of the invention to provide a remotely controlled, power-operated, servo-motor for controlling such a movable member, as for example, the displacement regulator of a variable displacement pump or other fluid pressure energy translating device, in which precisely controlled follow-up action between the movements given to the control element and the movements thereby imparted to the movable member may be achieved without requiring mechanical connection between the control element and the mechanism operating the member.

In fluid pressure energy translating devices of the type comprising a pump and a motor, one of which includes mechanism for varying its displacement, it is frequently desirable to operate the displacement regulator from a distance and in such cases it is necessary that the control element must so operate as to insure that the position of the displacement regulator always corresponds precisely to any position given to the control element. It is likewise necessary, particularly when large machines are subject to either manual control or to automatic control from a device capable of exerting very small forces, to provide a servo-motor for supplying the necessary force to actuate the displacement regulator. Where the control element is adjacent the displacement regulator and the servo-motor, it is a simple matter to insure precise follow-up control by the use of a mechanical connection of some sort between the servo-motor and the control element. In situations where it is impractical to run a mechanical connection from the servo-motor to the control element, various types of electric or hydraulic telemetric connections have heretofore been utilized in place of a direct mechanical connection. The use of devices of this character involves not only complicated and expensive apparatus but is frequently subject to derangement due to the difficulty of maintaining a constant phase relation between the input and output elements of the telemetric connection. This is particularly true with hydraulic telemetric devices heretofore used, where the inherent and unavoidable leakage, expansion and contraction of transmission fluid due to temperature changes, etc., prevent the output member of the telemotor from exactly following the movements of the input member.

It is an object of this invention therefore to provide a simple and reliable remote control for a movable member in which power operation of the movable member with a follow-up action is provided which is not subject to the difficulties enumerated above and which is independent of unavoidable leakages as well as unavoidable variations in the working pressure of the fluid used to operate the system.

Further objects and advantages of the present invention will be apparent from the following description, reference being had to the accompanying drawings wherein a preferred form of the present invention is clearly shown.

Figure 2:
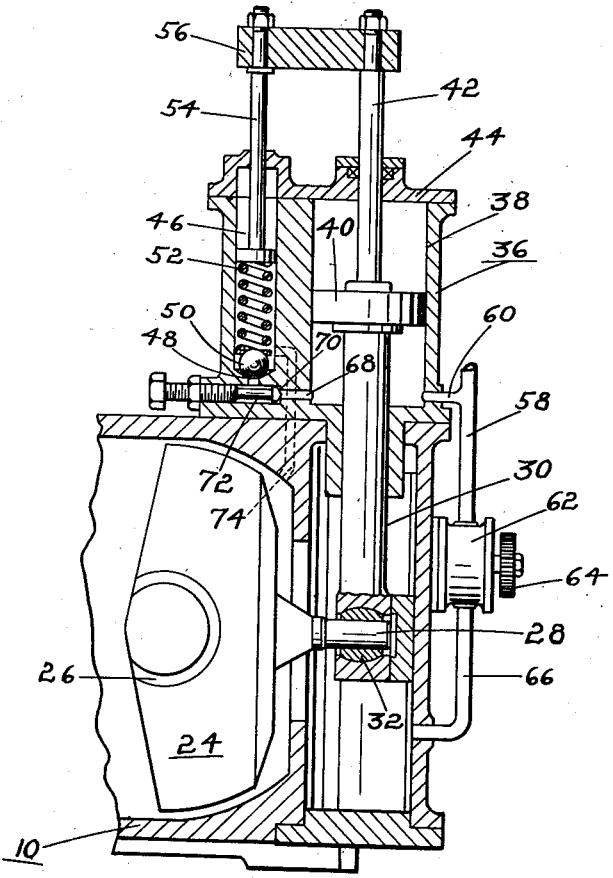
Fig. 2 is a longitudinal sectional view of a servo-motor mechanism showing a portion of the variable displacement pump to which the device is attached.

In the form of the invention illustrated in the drawings the control system is shown as applied to a variable displacement pump forming part of a variable speed fluid power transmission. A pump 10, illustrated as of the well-known "Waterbury" type, is driven by a constant speed electric motor 12 to withdraw fluid from a conduit 14 and supply fluid through a conduit 16, these conduits being connected to a suitable fluid motor, not shown, for driving a load device at variable speed. It will be understood that the mechanism of the pump 10 is capable of functioning equally well as a pump or as a motor and that where the term "pump" is used hereafter it is used to embrace such a structure regardless of whether it is functioning as a pump or as a motor. The pump 10 comprises a revolving cylinder barrel 18 wtihin the bores 20 of which pistons 22 may be reciprocated by an amount determined by the angular position of a tilting box 24 journalled on trunnions 26. The tilting box 24 carries a stud 28 (Fig. 2) connected to stem 30 by a pivoting and sliding connection 32 whereby the stem 30 may be moved vertically to vary the angular position of the tilting box 24 with relation to the shaft 34 of the pump 10.

Stem 30 thus comprises a movable member the position of which it is necessary to control precisely in order to determine the displacement of the pump 10. For this purpose a fluid motor 36 is provided comprising a cylinder 38 within which a piston 40 is adapted to reciprocate, the piston 40 being secured to the stem 30 and having a smaller stem 42 projecting from its upper surface and a cap 44 closing the upper end of the cylinder 38. The effective area of the piston 40 exposed to fluid pressure in the top of the cylinder 38 is thus larger than the effective area exposed to the fluid pressure in the bottom of the cylinder 38.

Adjacent the cylinder bore 38 there is formed a bore 46 having a valve seat 48 at its lower end adapted to be controlled by a ball valve 50. A spring 52 is interposed between the ball 50 and a plunger 54 projecting through the cap 44 and connected to the stem 42 by a block 56. The lower end of the cylinder 38 is in communication by means of a conduit 58 and a branch 60 with the outlet of a fixed displacement auxiliary pump 62 of any suitable construction, driven by means of gearing 64 from the shaft 34 of the pump 10. A conduit 66 supplies fluid to the pump 62 from the interior of the casing of the pump 10 which is normally filled with a suitable power transmission fluid such as lubricating oil. A passage 68 leads from the lower end of the cylinder 38 to an adjustable orifice 70 beyond which is located a chamber 72, the latter opening to the valve seat 48. The interior of the bore 46 is in communication with the interior of the casing of the pump 10 through a conduit 74.

Figure 1:
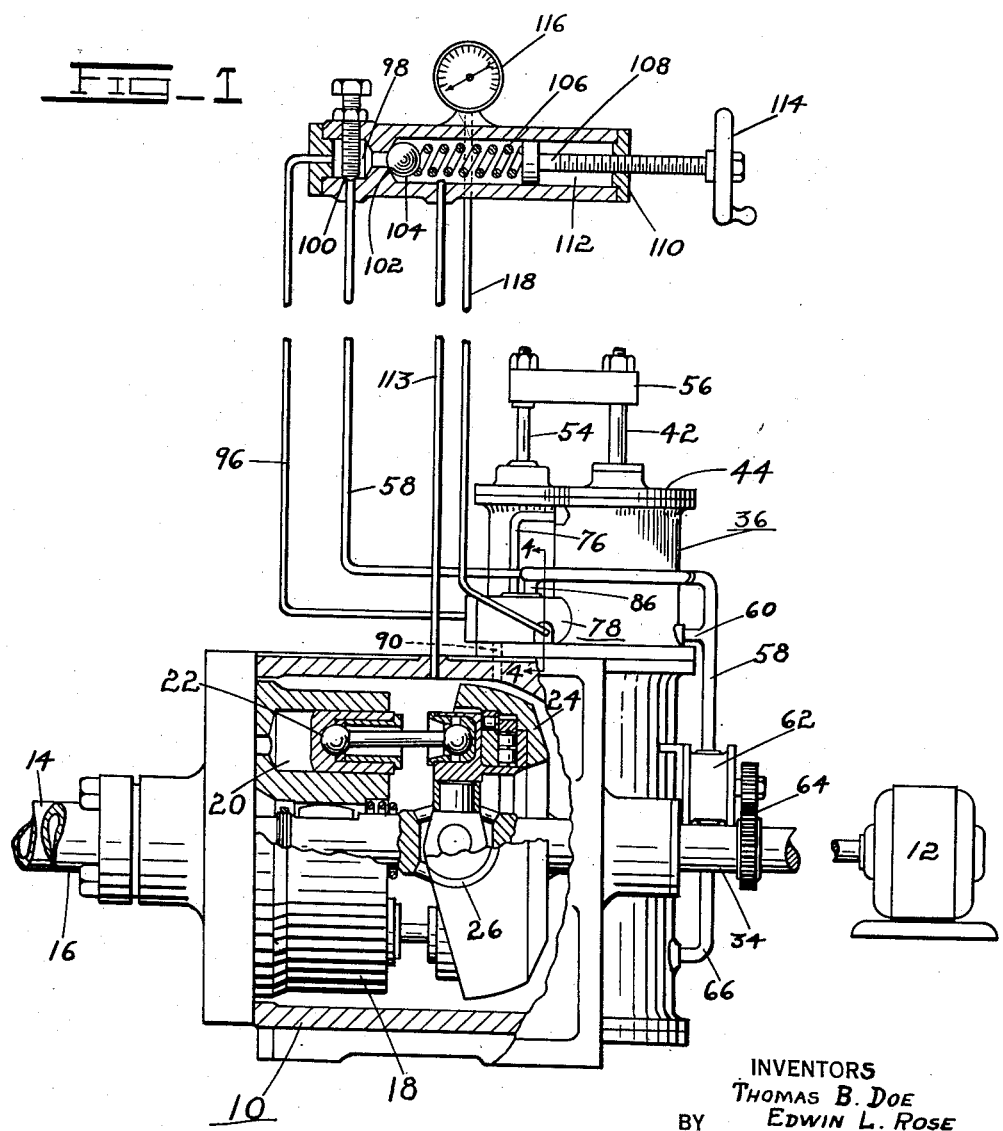
Fig. 1 is a diagrammatic view of a remote control follow-up servo-motor system embodying the present invention as applied to a variable displacement pump.
Figure 3:
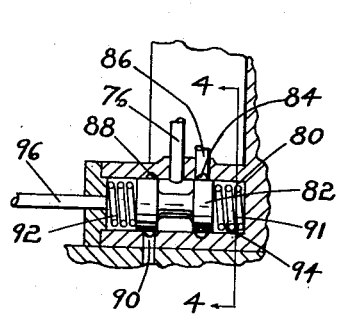
Fig. 3 is a fragmetnary sectional view on line 3—3 of Fig. 4.
Figure 4:
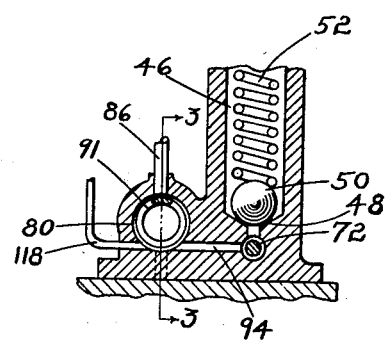
Fig. 4 is a fragmentary sectional view on line 4—4 of Fig. 1.

The upper end of the cylinder 38 communicates by means of a conduit 76 (Fig. 1) with a small piston valve indicated generally at 78 which is illustrated in detail in Fig. 3. By connecting the upper end of the cylinder 38 either to the outlet of the pump 62 or to the interior of the casing of the pump 10 or to neither, the valve 78 acts to control the direction and amount of movement of the motor 36 operating the movable member 30.

For this purpose valve 78 comprises a cylindrical bore 80 within which is freely slidable a spool shaped piston valve 82. A circumferential groove 84 is conencted to a conduit 86 leading to the conduit 58. Similarly, a circumferential groove 88 is connected to a conduit 90 leading to the interior of the casing of the pump 10. Conduit 76 communicates with the bore 80 at a point mid-way between the grooves 84 and 88, the piston 82 in its mid-position being so proportioned as to substantially close off communication between conduit 76 and either of the grooves 84 and 88. Light springs 91 and 92 may be provided at opposite ends of the piston 82 for the purpose of centering the same when the fluid pressure on the opposite end faces of the piston 82 are equal.

The chamber 72 between the orifice 70 and the valve 48 is in communication with the right-hand end of the bore 80 through a bore 94 so that a body of fluid is maintained on the right end face of the piston 82, which is under a pressure determined by the valve 48 which is in turn under the influence of the spring 50, and plunger 54, which is in turn connected to the movable member 30 through the stem 42 and block 56. The left-hand end of the bore 80 is connected by means of a conduit 96 to a chamber 98 analogous to the chamber 72. Conduit 58 leads to an adjustable orifice 100 emptying into the chamber 98 in communication with which is also a valve seat 102 controlled by a ball valve 104 analogous to the seat 48 and ball 50 previously described. A spring 106 urges the ball 104 onto the seat 102 and is under the control of an adjustable plunger 108 which may be threaded in a cap 110 closing a bore 112 within which the ball 104 and spring 106 are mounted. A handwheel 114 is provided for rotating the plunger 108 to control the pressure exerted by the spring 106 or ball 104.

Springs 52 and 106, balls 50 and 104, and valve seats 48 and 102 are preferably identical as to size and proportion in order to simplify the calibration of the device. The left-hand end face of the piston 82 is thereby under the influence of a body of fluid, the pressure of which is determined by that existing in the chamber 98, which in turn is controlled by the pressure exerted on the ball 104 by the spring 106 which depends upon the position of the plunger 108, the latter thus forming a control element movable in accordance with the movements which it may be desired to impart to the movable member 30.

In order to provide a tell-tale indication of the movements of the stem 30, if desired, a pressure gauge 116 may be provided communicating by a conduit 118 with the right-hand end of the bore 80 to indicate the pressure existing therein. The gauge may be calibrated in any desired units; such as, percentage of full rated displacement of the pump 10, inches of movement of the movable member, or pounds per square inch of pressure.

In operation of the device the motor 12 being running continuously at constant speed, the displacement of the pump 10 may be controlled by operating the handwheel 114. It will be seen that the auxiliary pump 62 constantly withdraws fluid through the conduit 66 from the interior of the casing of the pump 10. The latter is preferably connected to a suitable expansion tank, not shown. The full outlet pressure of the pump 62 is exerted on the fluid beneath the piston 40 through the conduits 58 and 60, thus producing a constant tendency of urging the piston 40 and movable member 30 upwardly in Fig. 2. The fluid pressure exerted on the top face of the piston 40, which is of larger area than the bottom face, is under the control of the piston valve 78 so that with the piston 82 in the position illustrated in Fig. 3, the fluid within the upper end of cylinder 38 is trapped and piston 40 is thus prevented from moving upwardly.

If piston 82 be moved to the right, conduit 76 is connected to conduit 86 and fluid under pressure from the pump 62 is admitted through conduits 58, 86, 84, 80 and 76, and piston 40 and stem 30 are thereby caused to move downwardly. Likewise, if the piston 82 be moved to the left, the upper end of cylinder 38 is connected to the interior of the casing of the pump 10 through conduits 76, 80, 88, and 90, permitting the piston 40 and stem 30 to move upwardly under the pressure of the fluid exerted on the bottom face of the piston 40.

The piston 82 is under the conjoint control of the control element 108 and movable member 30. This control is exercised through the two bodies of fluid maintained at varying predetermined pressures within the chambers 72 and 98. It will be seen that two continuously flowing streams of fluid, which may be very small in amount compared to the total output of the pump 62, are permitted to pass from the outlet of the pump 62 to the interior of the casing of the pump 10. One stream passes from the conduit 58, through conduit 60, across the lower end of cylinder 38, through conduit 68, orifice 70, chamber 72, and through the orifice formed by the ball 50 and seat 48 to the bore 46 and conduit 74. The other stream passes through conduit 58, orifice 100, chamber 98, through the orifice formed by the ball 104 and seat 102, to the bore 112, and through the conduit 113 to the interior of the pump casing.

It will be seen that the pressure maintained in the chamber 72 depends upon the degree of compression of the spring 52 and likewise, that the pressure in the chamber 98 depends upon the degree of compression of the spring 106. So long as the springs 52 and 106 are compressed equally, the pressures in the chambers 72 and 98 will be equal. The piston 84 will therefore be maintained in mid-position, illustrated in Fig. 3, and the movable member 30 will be held stationary. Whenever the position of the movable member 30 does not correspond with the position of the control element 108 due either to a movement imparted to the latter for the purpose of changing the displacement of the pump 10, or due to a movement of the member 30 caused by leakage at the motor 38, the balance between the pressures in the chambers 72 and 98 will be disturbed and piston 82 will thereby move in the proper direction to bring the member 30 into the position corresponding to the position of the control element 108.

The adjustable orifices 70 and 100 are preferably given a permanent adjustment such that the orifices are of equal areas and also to provide a rather small average flow therethrough in relation to the maximum capacity of the pump 62. It will be seen that since the chambers 72 and 98 are supplied with fluid from a common source and since the fluid is returned to a common dump, that the position of the valve 82 is independent of any reasonable fluctuations in the outlet pressure of the pump 62 or in the slight head on the fluid within the casing of the pump 10 which may be produced by variations in the level at the expansion tank.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device the combination of a variable displacement pump, a member movable to vary the pump displacement and a remotely operable follow-up control for said member comprising a fluid motor for operating said member in either direction, a valve for controlling said motor, a control element movable in accordance with the desired movements of said member, means for maintaining a first body of fluid at a pressure varying with the position of said member, means for maintaining a second body of fluid at a pressure correspondingly varying with the position of the control element, said valve being subject to the opposed action of said fluid bodies to cause said motor to move said member by an amount corresponding to any movement given to said control element whereby the pump displacement may be regulated to any desired value from a distance through fluid conduits alone.

2. In a fluid pressure energy translating device the combination of a variable displacement pump, a member movable to vary the pump displacement and a remotely operable follow-up control for said member comprising a fluid motor for operating said member in either direction, a valve for controlling said motor, a control element movable in accordance with the desired movements of said member, means including an orifice variable with the position of said member for maintaining a first body of fluid at a pressure varying with the position of said member, means including an orifice variable with the position of said control element for maintaining a second body of fluid at a pressure correspondingly varying with the position of the control element, said valve being subject to the opposed action of said fluid bodies to cause said motor to move said member by an amount corresponding to any movement given to said control element whereby the pump displacement may be regulated to any desired value from a distance through fluid conduits alone.

3. In a fluid pressure energy translating device the combination of a variable displacement pump, a member movable to vary the pump displacement and a remotely operable follow-up control for said member comprising a fluid motor for operating said member in either direction, a valve for controlling said motor, a control element movable in accordance with the desired movements of said member, means for maintaining a first body of fluid at a pressure varying with the position of said member, means for maintaining a second body of fluid at a pressure correspondingly varying with the position of the control element and a common source of supply of fluid pressure for both said means, said valve being subject to the opposed action of said fluid bodies to cause said motor to move said member by an amount corresponding to any movement given to said control element whereby the pump displacement may be regulated to any desired value from a distance through fluid conduits alone.

4. In a fluid pressure energy translating device the combination of a variable displacement pump, a member movable to vary the pump displacement and a remotely operable follow-up control for said member comprising a fluid motor for operating said member in either direction, a valve for controlling said motor, a control element movable in accordance with the desired movements of said member, means including a spring-loaded pressure drop valve variable with the position of said member for maintaining a first body of fluid at a pressure varying with the position of said member, means including a spring-loaded pressure drop valve variable with the position of said control element for maintaining a second body of fluid at a pressure correspondingly varying with the position of the control element, said valve being subject to the opposed action of said fluid bodies to cause said motor to move said member by an amount corresponding to any movement given to said control element whereby the pump displacement may be regulated to any desired value from a distance through fluid conduits alone.

5. In a device for controlling the position of a movable member from a distance the combination of a fluid motor for operating said member in either direction, a valve for controlling said motor, a control element movable in accordance with the desired movements of said member, means for maintaining a first body of fluid at a pressure varying with the position of said member, means for maintaining a second body of fluid at a pressure correspondingly varying with the position of the control element, said valve being subject to the opposed action of said fluid bodies whereby said motor is caused to move said member by an amount corresponding to any movement given to said control element.

6. In a device for controlling the position of a movable member from a distance the combination of a fluid motor for operating said member in either direction, a valve for controlling said motor, a control element movable in accordance with the desired movements of said member, means including an orifice variable with the position of said member for maintaining a first body of fluid at a pressure varying with the position of said member, means including an orifice variable with the position of said control element for maintaining a second body of fluid at a pressure correspondingly varying with the position of the control element, said valve being subject to the opposed action of said fluid bodies whereby said motor is caused to move said member by an amount corresponding to any movement given to said control element.

7. In a device for controlling the position of a movable member from a distance the combination of a fluid motor for operating said member in either direction, a valve for controlling said motor, a control element movable in accordance with the desired movements of said member, means for maintaining a first body of fluid at a pressure varying with the position of said member, means for maintaining a second body of fluid at a pressure correspondingly varying with the position of the control element and a common source of supply of fluid pressure for both said means, said valve being subject to the opposed action of said fluid bodies whereby said motor is caused to move said member by an amount corresponding to any movement given to said control element.

8. In a device for controlling the position of a movable member from a distance the combination of a fluid motor for operating said member in either direction, a valve for controlling said motor, a control element movable in accordance with the desired movements of said member, means including a spring-loaded pressure drop valve variable with the position of said member for maintaining a first body of fluid at a pressure varying with the position of said member, means including a spring-loaded pressure drop valve variable with the position of said control element for maintaining a second body of fluid at a pressure correspondingly varying with the position of the control element, said valve being subject to the opposed action of said fluid bodies whereby said motor is caused to move said member by an amount corresponding to any movement given to said control element.

9. A remote controlled, power operated, follow-up, servo-motor comprising in combination, a movable member the position of which is to be controlled, a control element movable in accordance with the desired movements of said member, a motor for moving said member, means for controlling the operation of said motor in either direction, and responsive to fluid pressure differentials caused by non-correspondence between the positions of said movable member and said control element to initiate operation of the motor in the direction and by the amount necessary to bring the movable member into the position corresponding to the position of the control element, and fluid pressure responsive means for indicating the position of the movable member at a point remote from the member.

10. In a fluid pressure energy translating device the combination of a variable displacement pump, a member movable to vary the pump displacement and a remotely operable follow-up control for said member comprising a fluid motor for operating said member in either direction, a valve for controlling said motor, a control element movable in accordance with the desired movements of said member, means for maintaining a first body of fluid at a pressure varying with the position of said member, means for maintaining a second body of fluid at a pressure correspondingly varying with the position of the control element, said valve being subject to the opposed action of said fluid bodies to cause said motor to move said member by an amount corresponding to any movement given to said control element, whereby the pump displacement may be regulated to any desired value from a distance through fluid conduits alone, and means responsive to the pressure existing in one of said bodies of fluid for indicating the position of said movable member.

11. In a fluid pressure energy translating device the combination of a variable displacement pump, a member movable to vary the pump displacement and a remotely operable follow-up control for said member comprising a fluid motor for operating said member in either direction, a valve for controlling said motor, a control element movable in accordance with the desired movements of said member, means for maintaining a first body of fluid at a pressure varying with the position of said member, means for maintaining a second body of fluid at a pressure correspondingly varying with the position of the control element, and an auxiliary pump driven with said variable displacement pump, forming a common source of supply of fluid pressure for both said means, said valve being subject to the opposed action of said fluid bodies to cause said motor to move said member by an amount corresponding to any movement given to said control element, whereby the pump displacement may be regulated to any desired value from a distance through fluid conduits alone, said follow-up control system and said variable capacity pump having a common low pressure fluid reservoir.

12. In a fluid pressure energy translating device the combination of a variable displacement pump, a member movable to vary the pump displacement, a control element movable in accordance with the desired movements of said member, a motor for moving said member, means for controlling the operation of said motor in either direction, fluid pressure operated means for operating said motor controlling means in one direction in response to movement of the control element, fluid pressure operated means for operating said motor controlling means in the opposite direction upon corresponding movement of the movable member, and fluid conduits comprising the sole connection between the control element and the motor controlling means.

13. A remote controlled, power operated, follow-up servo-motor comprising in combination, a movable member the position of which is to be controlled, a control element movable in accordance with the desired movements of said member, a fluid pressure operated motor for moving said member, a first pilot circuit open to continuous flow of fluid therethrough, means for controlling the pressure in a portion of said circuit in accordance with the position of the control element, a second pilot circuit open to continuous flow of fluid therethrough, means for controlling the pressure in a portion of said circuit in accordance with the position of the movable member, said first controlling means being remotely positioned with respect to the second controlling means and mechanically independent thereof, and means responsive to divergencies in the fluid pressures in said circuits and connected therebetween for connecting said motor to a source of pressure fluid to bring the movable member to a position corresponding to the position of the control element.

14. A remote controlled, power operated, follow-up, servo-motor comprising in combination, a movable member the position of which is to be controlled, a control element movable in accordance with the desired movements of said member, a fluid pressure operated motor for moving said member, a first pilot circuit, a means for controlling a variable characteristic of the fluid in a portion of the circuit, in accordance with the position of the control element, a second pilot circuit, a means for controlling a variable characteristic of the fluid in a portion of the circuit in accordance with the position of the movable member, said first controlling means being remotely positioned with respect to the second controlling means and mechanically independent thereof, and means responsive to divergencies in the fluid characteristic in said circuit portions and connected therebetween for connecting said motor to a source of pressure fluid to bring the movable member to a position corresponding to the position of the control element.

THOMAS B. DOE.
EDWIN L. ROSE.